United States Patent

Wai

Patent Number: 5,752,435
Date of Patent: May 19, 1998

[54] BEANSPROUTS ROOTS AND HUSKS CLEANING MACHINE

[76] Inventor: Ma Kee Wai, 74, Blewers Road, Morayfield Queensland 4506, Australia

[21] Appl. No.: 507,408

[22] PCT Filed: Feb. 24, 1994

[86] PCT No.: PCT/AU94/00088

§ 371 Date: Oct. 18, 1995

§ 102(e) Date: Oct. 18, 1995

[87] PCT Pub. No.: WO94/18856

PCT Pub. Date: Sep. 1, 1994

[30] Foreign Application Priority Data

Feb. 24, 1993 [AU] Australia ............... 7455/93

[51] Int. Cl.$^6$ .................. A47J 17/06; B07B 1/22; B08B 3/06
[52] U.S. Cl. .................. 99/567; 15/3.16; 15/3.2; 99/546; 99/623; 99/626; 99/627; 99/630; 99/635; 209/288; 209/291
[58] Field of Search .................. 99/623–636, 540, 99/546, 639, 567, 518, 537, 645; 15/3.16, 3.19, 3.2; 209/288–293, 303, 304, 270, 284, 280

[56] References Cited

U.S. PATENT DOCUMENTS

| | | | |
|---|---|---|---|
| 1,309,754 | 7/1919 | Dovel | 209/291 X |
| 1,430,664 | 10/1922 | Madson | 209/291 |
| 1,676,306 | 7/1928 | White | 15/3.2 X |
| 1,925,362 | 9/1933 | Anstiss | 15/3.16 X |
| 2,525,734 | 10/1950 | Sweet | 209/293 |
| 3,731,797 | 5/1973 | Tanner | 99/645 X |
| 3,909,291 | 9/1975 | Leong | 99/518 X |
| 4,159,242 | 6/1979 | Walker | 209/291 X |
| 4,223,688 | 9/1980 | Nylund et al. | 99/567 |
| 5,452,651 | 9/1995 | Pao-Seng | 99/546 |
| 5,474,186 | 12/1995 | Fulghum, Jr. et al. | 209/291 |

FOREIGN PATENT DOCUMENTS

| | | |
|---|---|---|
| 50087/72 | 6/1974 | Australia . |
| 71531/81 | 11/1981 | Australia . |
| 82755/82 | 10/1982 | Australia . |
| 84588/82 | 10/1983 | Australia . |
| 727364 | 6/1932 | France . |
| 04-148602 | 5/1992 | Japan . |
| 06-022734 | 2/1994 | Japan . |

Primary Examiner—Timothy F. Simone

[57] ABSTRACT

A beansprouts roots, husks, cleaning machine is disclosed. The machine has an internal spiral (7) and external spiral (6) in opposite directions mounted on the perforated cylinder (3) with integrated grouts bearings (8) driven by a motor rotating inside a casing cylinder (1). When the unclean sprouts are loaded by the given direction into the rotating perforated cylinder (3); causing by the rotating cycle, the roots are broken and the husks separated which then gets through the holes (4) into the gap (5) between the rotating cylinder (3) and casing (1), pushing out in one direction by the external spiral (6) as by-product. The clean sprouts are being pushed out by the internal spiral (7) in another direction as products. The machine can be used as a single or double, even multicylinders to clean the roots and husks and in different quantities of product in demand.

19 Claims, 2 Drawing Sheets

BEANSPROUTS ROOTS AND HUSKS CLEANING MACHINE

BACKGROUND OF THE INVENTION

1. Field of the Invention

This invention relates to improvements in machinery for cleaning roots and husks of mung and soya beansprouts.

2. Description of the Background

The lack of good quality sprouts (without roots and husks) has been a problem for cooking dishes. Not only does it cause the appearance of untidiness in the dish, but it also causes the natural taste of the vegetable to diminish.

There have been some proposals to clean the sprouts with machinery, but these have proven ineffective. The percentage of the by-products (roots, husks) along with the sprouts was just as high after cleaning with this machine as for sprouts which had not gone through the machine. For example, one previous machine included a group of devices for beating and pushing the sprouts within a container of water followed by the addition of a suction machine to vacuum the floating by-products.

These proposals have the disadvantage of removing limited roots, while still leaving a number of husks and roots along with the sprouts. Another disadvantage of these processes is that many sprouts become broken from the action of the machinery. In the end, the quality of the sprouts is not as high as it should be. Even though the consumers may remove the by-products, the problem of the broken sprouts still remains.

SUMMARY OF THE INVENTION

These problems are overcome by the present invention which provides a machine for cleaning roots and husks from beansprouts comprising a non-elastic rotation cylinder inside a casing cylinder.

The rotating cylinder is adapted to break only the roots of the beansprouts and at the same time to separate the by-products from the sprouts.

In one form of the invention, the machine for separating beansprouts from roots and husks comprises a perforated rotating cylinder inside a casing.

The spinning motion of the rotating cylinder enables the by-products to become separated from the products by travelling through the perforated holes and into the gap between the rotating cylinder and the casing.

In another form of the invention the rotating cylinder includes two spiral strips internally and externally attached so that as the rotating cylinder rotates, the spirals will travel in opposite directions to one another. The spirals are shaped so that once screening takes place due to the rotating cylinder's rotation, the by-products are screened through the perforated holes and then transported within the gap between the rotating cylinders and the casing in the direction of the loading inlet.

In this instance the external spiral acts as a pushing device for transporting the by-products out of the machine.

As the unprocessed sprouts are loaded continuously, a direct horizontal force is exerted, enabling the rotating sprouts to be transported from one end to the other as products are separated from by-products through the continual rotating screening process.

The internal spiral assists only in the guiding of the products from one end to the other and is not a necessity to the transportation of the sprouts.

BRIEF DESCRIPTION OF THE DRAWINGS

To assist with understanding the invention, reference will now be made to the accompanying drawings which show one example of the invention. In the drawings, FIG. 1. shows one example of a beansprouts, roots and husks cleaning machine according to this invention.

DESCRIPTION OF THE PREFERRED EMBODIMENTS

Figure 1:
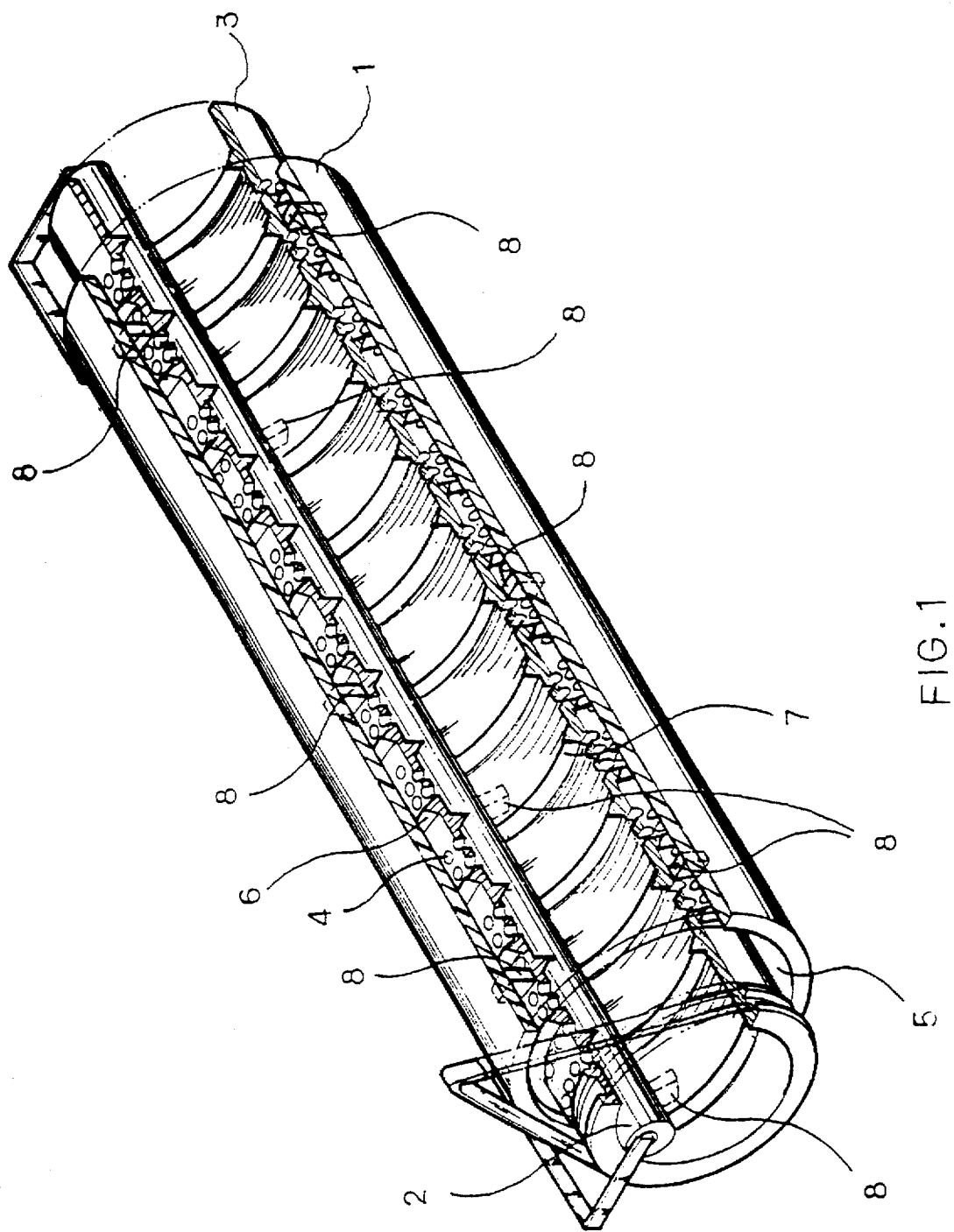

Throughout the rotating cylinder perforated holes form a screening mechanism which enables the separation of the husks and roots from the sprouts during the rotating cycle. It is essential that the range in diameter of the perforated holes lie between 5.00 mm to 12.70 mm only, allowing only roots and husks to travel through the perforated holes while leaving the sprouts within the rotating cylinder. Outside this range either the roots and husks may not get through the perforated holes or more of the unprocessed sprouts than desired will get through the holes. The screening performance depends on the percentage of open space of the perforated holes throughout the rotating cylinder. The greater the open space the more by-products will travel through the holes. A range of 49% to 62% of open space through the rotating cylinder will produce satisfactory screening performance. A smaller or greater percentage in open area than the specified range will result in poor screening performances and may also produce a weakening to the rotating cylinder's required rigid structure.

Between the rotating cylinder and the casing is an additional 5.00 mm to 15.00 mm. In addition the height of the external spiral is fixed to ensure the smooth spinning of the rotating cylinder inside the casing. The height of the external spiral is restricted between 5 mm to 15 mm, preferably 7.50 mm to 15.00 mm. This height plays a crucial role in the invention. Once the by-products have been screened into the gap between the rotating cylinder and the casing, the height of the external spiral must be at least the foregoing minimum to avoid jamming of the by-products within the gap. If the external spiral is above the maximum height, a higher than desired percentage of unprocessed or processed sprouts will get through the perforated holes into the gap, thereby being wasted as by-products.

As the screening process continues, the build up of the by-products within the perforated holes reduces the amount of the open space. It is then essential to have a full length brush. The brush is located against the inner surface of the rotating cylinder supported by brackets to the casing. In effect the bristles are constantly in contact with the inner surface of the rotating cylinder and the internal spiral. Effectively the brush assists in the removal of the by-products building up on the perforated holes and the internal spiral. The brush assists in constantly keeping the perforated holes open and free of build up to the internal spiral. This helps maintain the optimum open space for the screening to work.

The diameter of the rotating cylinder plays an important role in the invention. The recommended diameter of the rotating cylinder is between 300 mm to 900 mm. For the roots and husks to get through the perforated holes, time is required. The smaller the diameter of the rotating cylinder, the less distance is required for the roots and husks to travel through the perforated holes, thus resulting in a quicker time of screening out the by-products. But this also causes the loading capacity to be decreased, resulting in a lower output capability versus time. On the other hand, the greater the diameter of the rotating cylinder, the longer time of screening will be required due to the greater distance the roots and husks must travel. Again, it results in a lower performance in output. Unclean products may also result, if the diameter is greater than specified.

The rotation speed of the rotation cylinder plays a crucial role to the invention. A recommended rotation speed between 30 rpm to 120 rpm is required to make this invention workable. Within the specified rotation speed three forces (centrifugal, gravity and friction) act together to create the optimum screening process for removing the by-products from the products successfully. Once the unprocessed sprouts are rotated inside the rotating cylinder, the forces of centrifugal, gravity and friction act on the sprouts, creating a scrubbing action with each other and enabling the fragile roots to break from the stronger stem of the sprout. As this process is continued with the continuous rotation of the rotating cylinder, a greater quantity of the by-products is screened through the perforated holes. At the end, the products are separated from the by-products and fall as clean sprouts.

The rotating and the casing cylinders may be manufactured from any material which is non-elastic. This produces a strong, rigid structure for the rotating cylinder and the casing. Examples of materials include molded plastic and metals.

Referring to FIG. 1, it can be seen that the beansprout, roots and husks cleaning machine according to this invention comprises a non-elastic rotating cylinder 3 driven by a motor. Cylinder 3 rotates inside of a non-elastic casing cylinder 1 which in turn is supported by three groups of bearings 8 built onto the rotating cylinder 3. On the rotation cylinder 3 there are specified sizes of perforated holes 4 throughout the cylinder 3 to form a screen with a maximum "open area" for the by-products to pass through.

The rotating cylinder 3 includes two spirals, internally 7 and externally 6 in opposite directions. The specified diameter of the rotating cylinder 3 allows the maximum volume of unclean sprouts for a specified rotation speed to become separated. As the external spiral 6 pushes the by-products towards the loading direction inside the gap 5 between the rotation cylinder 3 and casing 1, they fall out. As the rotation cycle continues, the unclean sprouts travel away from the loading direction due to the horizontal loading force guided by the internal spiral 7. They fall out from the rotating cylinder 3 as clean products. As the brush 2 touches the inner surface of the rotating cylinder 3, it continuously keeps the holes open.

Figure 2:
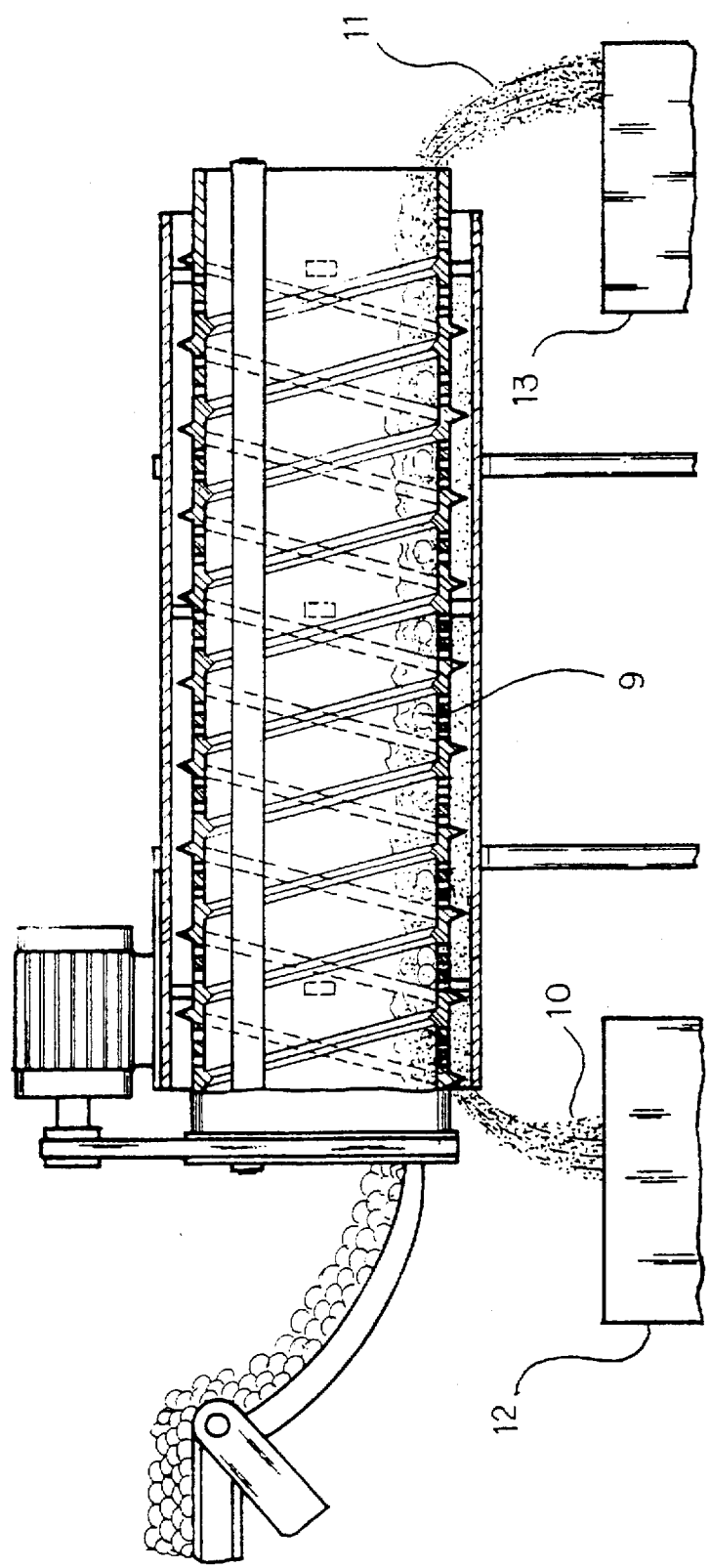
FIG. 2. shows the application of such a beansprouts, roots and husks cleaning machine in operation.

FIG. 2 shows the bean sprouts, roots and husks cleaning machine in operation. The unclean sprouts 9 are loaded into the rotating cylinder. In every rotation the roots will be broken instantaneously. The fragile roots are broken apart from the sprouts and the husks are easily removed from the beansprout head during this process. Afterwards, the roots and husks travel through the specified size of hole into the gap between the rotating cylinder 3 and the casing cylinder 1. Thereafter, the external spiral 6 removes these by-products 10 in an opposite direction to the loading direction so that they fall into a collection bin 12. By using the disclosed beansprouts, roots and husks cleaning machine, most of the by-products 10 are separated from the clean sprouts 11. The unclean sprouts 9 are continuously being pushed and transported by the horizontal loading force guided by the internal spiral 7 at a respectable length from the loading area to the end of the cylinder 3. Thus the by-products 10 of the beansprouts become less and less mixed with the clean beansprouts as the distance progresses. At the end, the cleaned sprouts travel to the end of the rotating cylinder 3 and fall out into the collection bin 13 as clean sprouts 11 in the same direction as the loading.

In the process of using the disclosed beansprouts, roots and husks cleaning machine, most of the by-products 10 have been separated out, leaving very high quality rootless, huskless, clean beansprout products 11. This process makes the sprouts look very nice in appearance and produces a much better tasting vegetable than previously.

It will be realized that the beansprouts, roots and husks cleaning machine according to this invention is not restricted to the form of a single cylinder shown in the example, but also may be used as a double cylinder machine, or may be used with as many cylinders as required to suit the market demand.

I claim:

1. A machine for separating and cleaning beansprouts from beansprout roots, husks and other debris, comprising:
   a fixed casing cylinder;
   a perforated cylinder having first and second ends with a surface covered with perforations, said cylinder disposed within said casing cylinder co-axially with and rotatably about the axis of said casing cylinder;
   an annular gap between said casing cylinder and said perforated cylinder;
   means for delivering beansprouts contaminated with roots, husks and other debris to the interior of said perforated cylinder at said first end;
   means for rotating said perforated cylinder;
   a spiral strip projecting radially outwardly from and extending along the external surface of said perforated cylinder and into said annular gap to push said roots, husks and other debris which have passed through said perforated cylinder out of said gap near said first end of said perforated cylinder; and
   a brush disposed within said perforated cylinder and in contact with the internal surface of said perforated cylinder to keep said perforations free of buildup of roots, husks and other debris.

2. The machine of claim 1 further comprising a second spiral strip projecting radially inwardly from and extending along said internal surface of said perforated cylinder to guide said beansprouts towards said second end of said perforated cylinder.

3. The machine of claim 2 wherein said outwardly and said inwardly projecting spirals are characterized by oppositely directed pitches.

4. The machine of claim 1 wherein said perforations have a diameter within the range of about 7.94 mm to about 12.70 mm and said perforations comprise about 49–62 percent of the surface area of said perforated cylinder.

5. The machine of claim 1 wherein said brush extends along the entire length of said perforated cylinder.

6. The machine of claim 1 wherein the height of said outwardly mounted spiral is about 5–15 mm and the gap between said outwardly mounted spiral and said casing cylinder is about 3–6 mm.

7. The machine of claim 1 wherein said means for rotating rotates said perforated cylinder at a speed of about 40–70 rpm.

8. A machine for separating and cleaning beansprouts from beansprout roots, husks and other debris, comprising:
   a fixed casing cylinder;

a perforated cylinder having first and second ends with a surface covered with perforations, said perforated cylinder disposed within said casing cylinder co-axially with and rotatably about the axis of said casing cylinder, said perforated cylinder having a diameter of about 300–700 mm, said perforations having a diameter from about 7.94 mm to about 12.70 mm and covering about 49–62 percent of the surface of said perforated cylinder;

an annular gap between said casing cylinder and said perforated cylinder;

means for delivering beansprouts contaminated with roots, husks and other debris to the interior of said perforated cylinder at said first end;

means for rotating said perforated cylinder at a speed within the range of about 40–70 rpm;

a first spiral strip projecting radially outwardly from and extending along the external surface of said perforated cylinder and into said annular gap to push said roots, husks and other debris which have passed through said perforated cylinder out said annular gap near said first end of said perforated cylinder, said spiral strip having a height of about 5–15 mm from the external surface of said perforated cylinder and extending to within about 3–6 mm of said casing cylinder;

a second spiral strip projecting radially inwardly from and extending along said internal surface of said perforated cylinder to guide said beansprouts toward said second end of said perforated cylinder, said second spiral strip having a height of about 30–150 mm from the internal surface of said perforated cylinder, said first and second spiral strips characterized by oppositely directed pitches; and a brush disposed within said perforated cylinder and extending along the entire length of the internal surface thereof to keep said perforations free of buildup of roots, husks and other debris.

9. A cleaning machine for separating clean beansprouts from roots, husks and other debris, comprising:

a non-elastic, perforated, rotating cylinder disposed co-axially inside a non-elastic casing cylinder to produce a gap between said cylinders, said inner rotating cylinder including an external spiral strip mounted radially outwardly thereon, whereby the broken roots and husks caused by rotation of said perforated cylinder pass through said perforated cylinder into said gap and are pushed out as by-product; and a brush located against the inner surface of said rotating cylinder whereby the perforated holes of said rotating cylinder are kept free of buildup of broken roots and husks so that the cleaner sprouts travelling to the end of said rotating cylinder will fall out as product.

10. The cleaning machine of claim 9 wherein said rotating cylinder comprises perforated holes within a diameter range of 5.00 mm to 12.70 mm.

11. The cleaning machine of claim 10 wherein the percentage of the open area of the perforated holes is in the range between 49%–62%.

12. The cleaning machine of claim 9 wherein the height of said external spiral strip from the external surface of said rotating cylinder is between 5 mm to 15 mm.

13. The cleaning machine of claim 9 wherein the space between said external spiral strip and said casing cylinder is between 3 mm to 6 mm.

14. The cleaning machine of claim 9 wherein said rotating cylinder further comprises an internal spiral strip mounted radially inwardly on said rotating cylinder and rotating in an opposite direction to said external strip.

15. The cleaning machine of claim 14 wherein said brush is a full length bristle brush which touches the internal surface of said rotating cylinder and is also in contact with the internal strip.

16. The cleaning machine of claim 9 wherein the diameter of said rotating cylinder is no less than 300 mm and no greater than 900 mm.

17. The cleaning machine of claim 9 wherein said rotating cylinder is rotatable at a speed between about 30 rpm and 120 rpm.

18. The cleaning machine of claim 9 wherein said non-elastic, rotating cylinder is comprised of metal or molded plastic.

19. The cleaning machine of claim 9 wherein said non-elastic, casing cylinder is comprised of metal or molded plastic.

* * * * *